(12) United States Patent
Kato

(10) Patent No.: US 8,483,769 B2
(45) Date of Patent: Jul. 9, 2013

(54) MOBILE TERMINAL

(75) Inventor: Masataka Kato, Tokyo (JP)

(73) Assignee: Fujitsu Mobile Communications Limited, Kawasaki (JP)

( * ) Notice: Subject to any disclaimer, the term of this patent is extended or adjusted under 35 U.S.C. 154(b) by 467 days.

(21) Appl. No.: 12/398,633

(22) Filed: Mar. 5, 2009

(65) Prior Publication Data
US 2010/0029338 A1 Feb. 4, 2010

(30) Foreign Application Priority Data

Aug. 4, 2008 (JP) ................................ P2008-201211

(51) Int. Cl.
H04B 1/38 (2006.01)
(52) U.S. Cl.
USPC ............................. 455/566; 345/629; 345/619
(58) Field of Classification Search
None
See application file for complete search history.

(56) References Cited

U.S. PATENT DOCUMENTS

| 6,972,774 B2 * | 12/2005 | Eguchi ........................ 345/629 |
| 7,039,245 B1 * | 5/2006 | Hamery ........................ 382/233 |
| 7,580,577 B2 * | 8/2009 | Enokida et al. .............. 382/232 |
| 7,702,160 B2 * | 4/2010 | Kim ............................. 382/232 |
| 2003/0200278 A1 * | 10/2003 | Youn et al. .................... 709/217 |
| 2007/0132746 A1 * | 6/2007 | Wang et al. .................. 345/204 |
| 2007/0223882 A1 * | 9/2007 | Kuno ............................. 386/95 |
| 2008/0204438 A1 * | 8/2008 | Song et al. .................... 345/207 |
| 2008/0284798 A1 * | 11/2008 | Weybrew et al. ............ 345/630 |

FOREIGN PATENT DOCUMENTS

JP 2008-090645 A 4/2008

* cited by examiner

Primary Examiner — Vladimir Magloire
(74) Attorney, Agent, or Firm — Maschoff Brennan

(57) ABSTRACT

A mobile terminal includes a display unit configured to display a screen generated by combining plural screen layers, four controllers connected to the display unit; wherein a first controller determines whether a transmission specification of a subject screen layer to be updated is enabled upon updating of the screen, a second controller determines whether a size of the subject screen layer to be updated is equal to or larger than a size of a screen displayed by the display unit when the first controller determines "YES", a third controller determines whether the screen layer to be combined on a back surface of the subject screen layer to be updated exists when the second controller determines "YES"; and a fourth controller controls to disable the transmission specification of the subject screen layer to be updated when the third controller determines "NO".

10 Claims, 13 Drawing Sheets

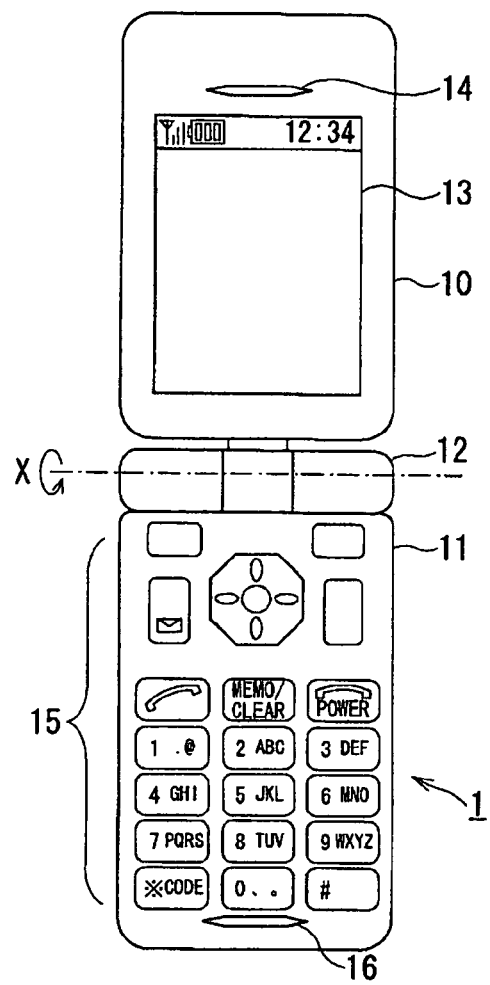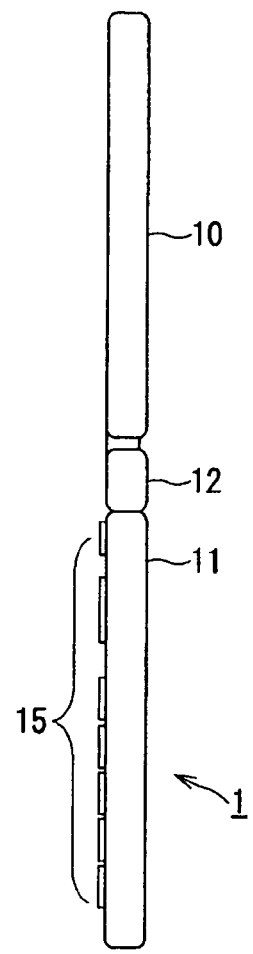
FIG. 1A  FIG. 1B
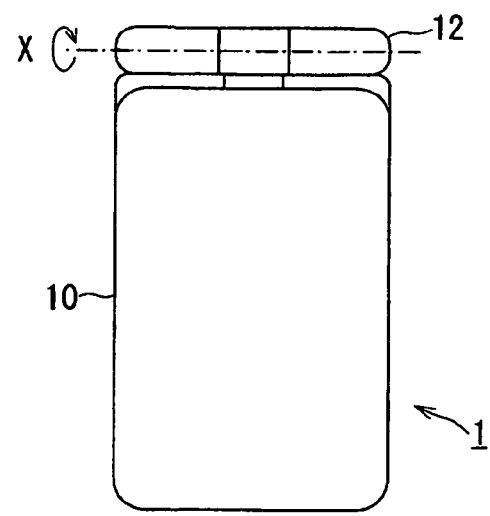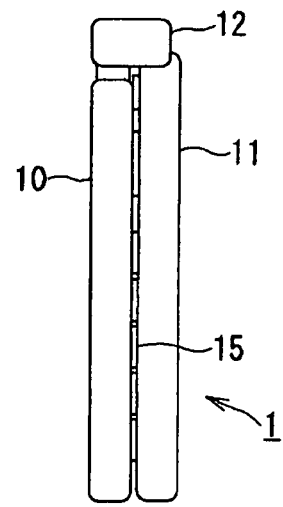
FIG. 2A  FIG. 2B

MOBILE TERMINAL

BACKGROUND OF THE INVENTION

1. Field of the Invention

The present invention relates to a mobile terminal capable of cancelling composition of the background layer based on the determination that the composition is unnecessary under the display control.

2. Description of the Related Art

Recently, the size of information data supplied to the user at a time has been increasing because of increased size of screen data accompanied with high definition of the display unit (display and the like) of such mobile terminal as the mobile phone. The time taken for the single updating of the screen has been prolonged and the power consumption has been increased owing to the increased screen data size on the display, resulting in deteriorated response to the user's operation and shortened battery life of the mobile terminal.

Japanese Unexamined Patent Application Publication No. 2008-90645 discloses the information processor structured to save the device development cost and a device cost, and further to realize the power saving while improving visual perceptivity of the user. The information processor includes a display unit of a predetermined size, and at least two applications installed therein for outputting display data of a preset size to be displayed on the display unit. The processor further includes a display image data generation unit for generating image data for the display each having the identical size using the respective display data output from the applications, and an image composition output unit for composing the generated image data for the display by superposition so as to be output and displayed on the display unit.

The image on the display of the mobile terminal is generated through composition of plural images (screen layers) The resultant performance is proportional to the number of the screen layers. In the generally employed mobile terminal, it is normally determined whether or not the transmission specification of the screen layer is enabled upon composition of the screen layers. However, it is generally designed to combine the background layer irrespective of the need of the background layer. Accordingly, it is preferable to design the mobile terminal to cancel composition of the background layer which is determined as being unnecessary while preventing the application program at the upper layer from correcting the error.

SUMMARY OF THE INVENTION

Accordingly, it is an object of the present invention to provide a mobile terminal with improved screen updating performance without causing the application program at the upper layer to correct the error by cancelling the combination of the background layer which is determined as being unnecessary under the display control as well as with improved response to the user's operation by reducing the load.

The present invention provides a mobile terminal which includes a display unit configured to display a screen generated by combining a plurality of screen layers, a controller connected to the display unit and including a first controller, a second controller, a third controller, and a fourth controller; wherein the first controller determines whether or not a transmission specification of a subject screen layer to be updated is enabled upon updating of the screen displayed by the display unit, the second controller determines whether or not a size of the subject screen layer to be updated is equal to or larger than a size of a screen displayed by the display unit when the first controller determines that the transmission specification is enabled, the third controller determines whether or not the screen layer to be combined on a back surface of the subject screen layer to be updated exists when the second controller determines that the size of the subject screen layer to be updated is equal to or larger than the size of the screen to be displayed by the display unit; and the fourth controller controls to disable the transmission specification of the subject screen layer to be updated when the third controller determines that the screen layer to be combined on the back surface does not exist.

When the background layer composition is determined to be unnecessary under the display control, the mobile terminal according to the present invention is structured to improve the screen updating performance without causing the application program at the upper layer to correct the error by cancelling the composition, and to improve the response to the user's operation by reducing the load.

BRIEF DESCRIPTION OF THE DRAWINGS

FIG. 1A is a front view of an mobile terminal (mobile phone) in an open state according to the present invention;

FIG. 1B is a side view of the mobile terminal (mobile phone) in an open state according to the present invention;

FIG. 2A is a front view of the mobile terminal (mobile phone) in a closed state according to the present invention;

FIG. 2B is a side view of the mobile terminal (mobile phone) in a closed state according to the present invention;

DESCRIPTION OF THE PREFERRED EMBODIMENTS

Figure 3:
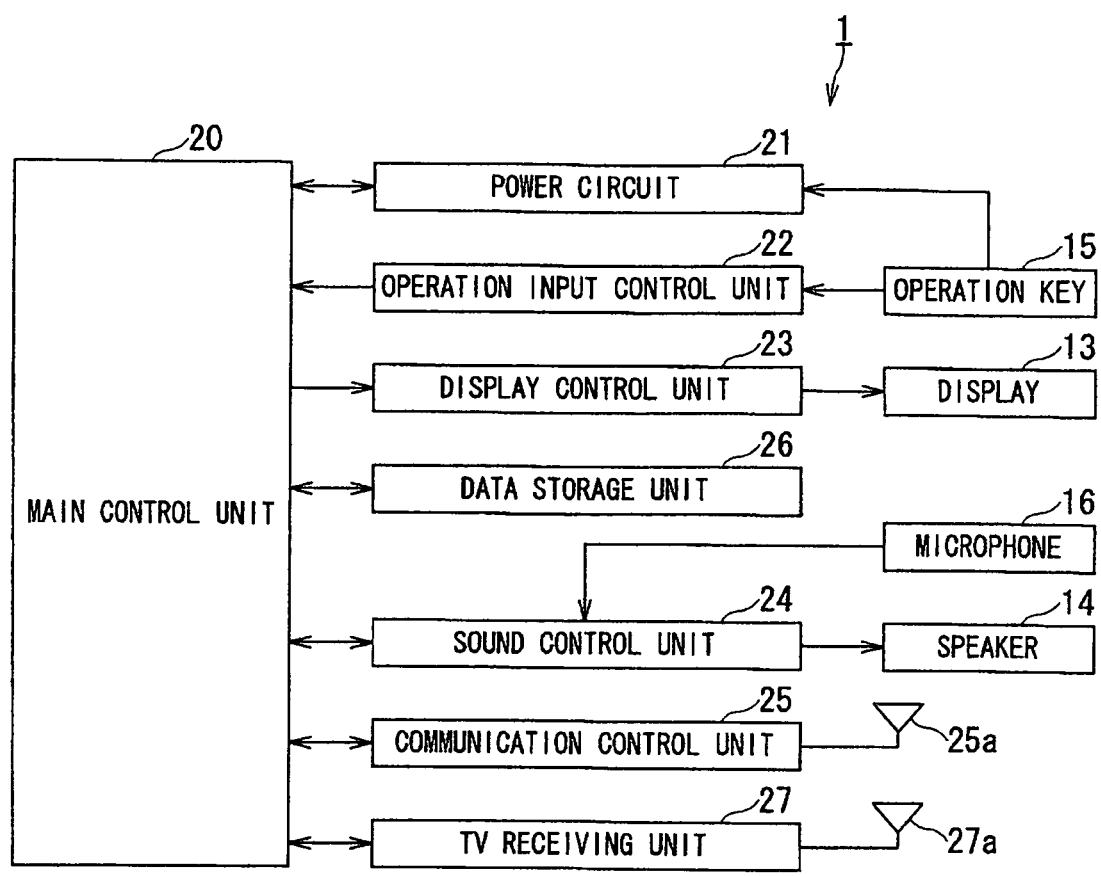
FIG. 3 is a functional block diagram of the mobile terminal (mobile phone) according to the present invention.

An mobile terminal as an embodiment according to the present invention will be described referring to the drawings. A mobile phone 1 of clamshell type formed by connecting plural casings so as to be opened and closed will be described as an example of the terminal device according to the present invention. FIG. 1A is a front view of the mobile phone 1 in an open state, and FIG. 1B is a side view of the mobile phone 1 in the open state according to the present invention. FIG. 2A is a front view of the mobile phone 1 in a closed state, and FIG. 2B is a side view of the mobile phone 1 in the closed state.

Referring to FIGS. 1 and 2, the mobile phone 1 is formed of a rectangular plate-like upper casing 10 and a lower casing 11 having substantially a same configuration as that of the upper casing 10. Each of the upper casing 10 and the lower casing 11 has the surface covered with each other in the closed state. The upper and the lower casings 10 and 11 are hinged with a hinge portion 12 therebetween. The upper casing 10 is structured to be rotatable around the hinge portion 12 with respect to the lower casing 11 at a predetermined angle in an X direction shown in FIGS. 1 and 2. The state of the mobile phone 1 is changed from the open state to the closed state or vice versa by rotating the upper casing 10 with respect to the lower casing 11.

A display 13 for displaying the display information which includes characters and images is formed on the inner surface of the upper casing 10 (opposite the lower casing 11). The display 13 may be a liquid crystal display as a liquid crystal panel, or an organic EL display as the organic EL panel. The liquid crystal panel changes the direction (orientation) of the liquid crystal molecules by applying the voltage to the liquid crystal. The resultant orientation change serves to shutter the light so as to block or transmit the light from the light source such as the backlight for displaying the predetermined data. The organic EL panel is structured to display the data using light emission caused by exciton resulting from recombination of electron injected into the organic compound with the electron hole. A speaker 14 for outputting the sound is disposed on the inner surface of the upper casing 10.

Operation keys 15 including a power key for turning power ON/OFF, a call key for calling, a ten-key for inputting numerals and characters, a short cut key for activating the mail function and Web browser and the like are disposed on the inner surface (opposite the upper casing 10) of the lower casing 11. A microphone 16 for collecting the sound is disposed on the inner surface of the lower casing 11.

Functions of the mobile phone 1 will be described referring to the block diagram shown in FIG. 3. The mobile phone 1 is formed by connecting a main control unit 20, a power circuit 21, an operation input control unit 22, a display control unit 23, a sound control unit 24, a communication control unit 25, a data storage unit 26, and a TV receiving unit 27 via bus lines so as to be mutually communicated with one another.

The main control unit 20 includes a CPU for performing various types of calculations to centrally control the mobile terminal 1 as well as perform display control to be described later and various calculation and control operations. The power circuit 21 turns the power ON/OFF based on the input performed by the user via the operation keys 15. When the power is turned ON, power is supplied from the power supply source (battery) to the respective units so as to activate the mobile terminal 1.

The operation input control unit 22 includes an input interface to the operation keys 15. When depression of any of the operation keys 15 is detected, the signal indicating the depressed key is generated, and transmitted to the main control unit 20. The display control unit 23 includes a display interface to the display 13 for displaying the character and image on the display 13 under the control of the main control unit 20.

The sound control unit 24 generates an analog sound signal from the sound collected by the microphone 16 under the control of the main control unit 20 so as to be converted into a digital sound signal. The sound control unit 24 converts the thus obtained digital sound signal into the analog sound signal under the control of the main control unit 20 so as to be output as the sound from the speaker 14.

The communication control unit 25 subjects the reception signal received from the base station via an antenna 25a to spread spectrum inverse processing under the control of the main control unit 20 to decompress the data. The data are transmitted to the sound control unit 24 to be output from the speaker 14 in response to the command of the main control unit 20, or transmitted to the display control unit 23 to be displayed on the display 13. Alternatively, they are stored in the data storage unit 26. Upon acquisition of the sound data collected by the microphone 17, the data input via the operation key 15, and the data stored in the data storage unit 26, the communication control unit 25 subjects those data to spread spectrum processing under the control of the main control unit 20 so as to be transmitted to the base station via the antenna 25a.

The data storage unit 26 includes a ROM for storing processing program and data required for the processing, a hard disk, a non-volatile memory, a database, a RAM for temporarily storing data to be used upon the processing performed by the main control unit 20 and the like. The processing program for the display control processing performed by the main control unit 20 is designed to be stored in the ROM, for example.

The TV receiving unit 27 includes a TV antenna 27a for receiving TV broadcasting wave such as the digital terrestrial one-segment broadcasting wave, the digital terrestrial broadcasting, and terrestrial 3-segment radio broadcasting wave from the broadcast station via the TV antenna 27a. The TV receiving unit 27 separates the received data with respect to those received TV broadcasting waves into the sound signal and the image signal to perform the TV visual processing by displaying the image signal on the display 13 by the display control unit 23, and outputting the sound signal by the sound control unit 24 via the speaker 14.

Figure 4:
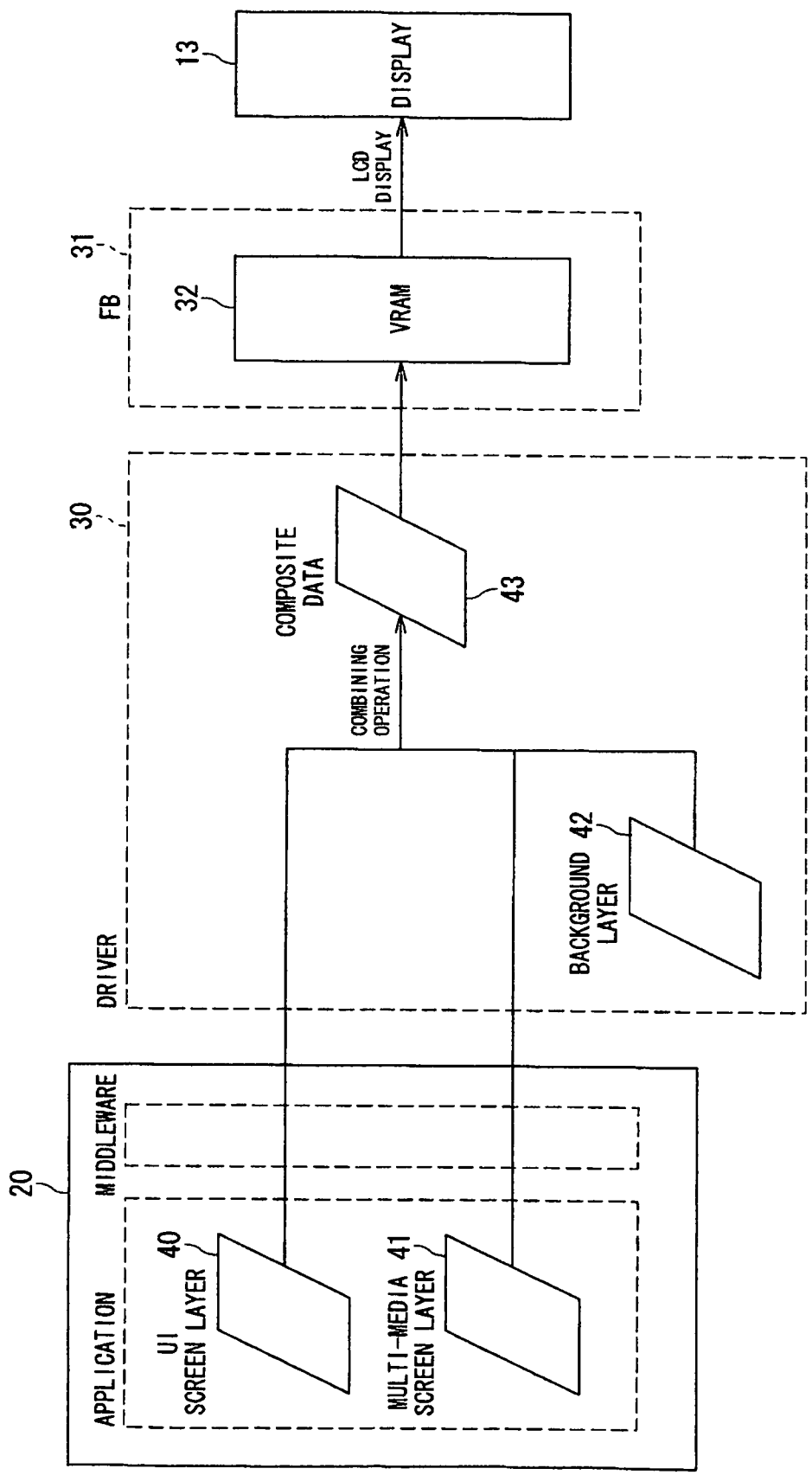
FIG. 4 is a view schematically showing the display control routine in the mobile terminal (mobile phone) according to the present invention.

Referring to FIG. 4, upon activation of the application program by the main control unit 20 in the mobile phone 1, plural screen layers are produced under the control of the application program. Those screen layers include an UI (User Interface) screen layer 40 for displaying the information for the user to operate the mobile phone 1 and a multi-media screen layer 41 for displaying the video image. Those plural screen layers are combined by the display control unit 23 so as to be displayed on the display 13. The UI screen layer 40 has the same size as that of the display screen 44 on the display 13.

Figure 5C:
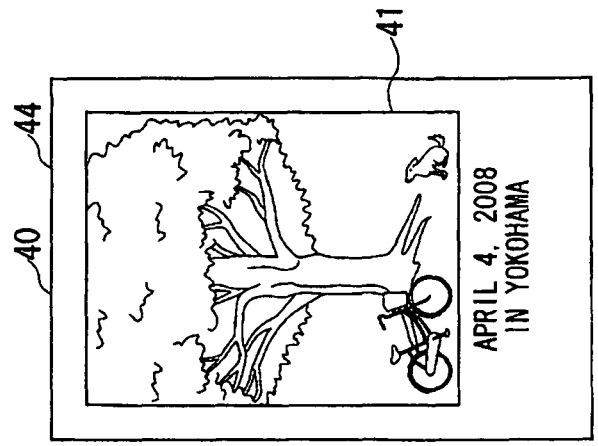
FIG. 5C shows a result of combining the UI screen layer with the multi-media screen layer.
Figure 5B:
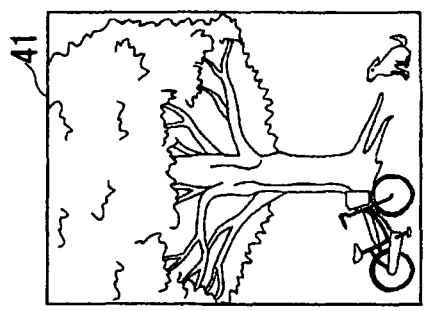
FIG. 5B is a view showing a multi-media screen layer.
Figure 5A:
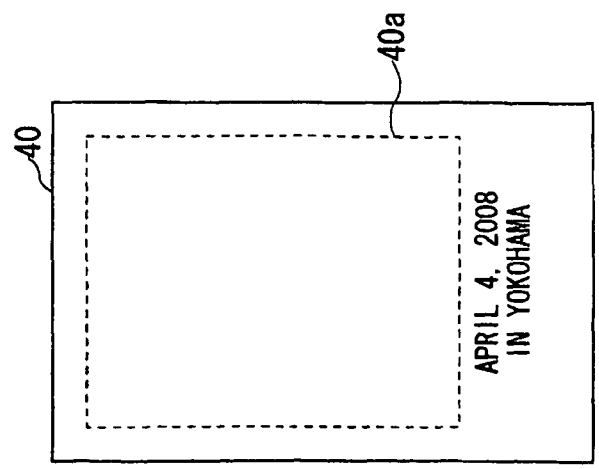
FIG. 5A is a view showing an UI screen layer.

The UI screen layer 40 includes a region for displaying such title as "Apr. 4, 2008 in Yokohama" on the display 13 as shown in FIG. 5A, a region 40a for displaying the video image (region specified as being in the transmissive mode), and a region which includes a region 40a (transmission specified) to allow the multi-media screen layer 41 to display the video image as shown in FIG. 5B. Referring to FIG. 5C, composite display data 43 are formed by superimposing the UI screen layer 40 with the multi-media screen layer 41 which is put in the region 40a specified as being in the transmissive mode as a part of the UI screen layer 40.

The display control unit 23 includes a driver 30 for allowing the display 13 to display the screen based on the screen layer generated by the main control unit 20, and an FB 31 for temporarily storing the data displayed on the display 13. When the driver 30 which includes a background layer 42 obtains plural screen layers from the main control unit 20, those screen layers are combined with the background layer 42 to generate the composite display data 43 so as to be output to the FV 31. The composite display data 43 are combined with the background layer 42 only at the time of need.

The FB 31 includes a VRAM 32 which temporarily stores the composite display data 43 formed by the driver 30 so as to be displayed on the display 13.

In the mobile phone 1, plural screen layers formed by the currently executed application programs are combined by the driver 30 under the control of the middleware. The composite result is transferred to the display 13 by the FB 31 so as to be displayed thereon. The content to be displayed on the display 13 is temporarily stored in the VRAM in the FB 31 for controlling the display 13, and referred at an interval indicated by a predetermined refresh rate to be displayed on the display 13.

Generally in the case where the plural screen layers are combined, when one of those screen layers is required to be updated or specified to be in the transmissive mode, all the screen layers which constitute the screen are referred and combined again so as to be displayed on the display 13. The screen layers are prepared by the number required to constitute the screen by executing the respective application programs. Actually, however, the background layer 42 held by the driver 30 is also combined in addition to those screen layers used by the application programs.

When any one of the screen layers is specified to be in the transmissive mode, the screen layer on the back surface is combined. When the layer on the back surface is further specified to be in the transmissive mode, the screen layer on the back surface is combined. The combining operation is repeatedly performed to finally combine the background layer 42 to form the composite display data 43. The need of setting the transmissive mode is specified for each of the screen layers, and is determined upon generation of the screen layer by the application program.

There are plural ways to realize the transmission from the processes (1) to (3) as follows.
(1) The specific color is defined as a color to be transmissive.
(2) The transmittance is set for each layer.
(3) The transmittance is set for each pixel.

Each setting of the aforementioned processes is kept unchanged irrespective of the condition of the data to be combined. That is, the specific color (case (1)), the fixed transmittance (case (2)), and the transmittance in accordance with the content to be displayed, that is, screen design (case (3)) may be set. Each setting of the processes (1) to (3) may be kept unchanged irrespective of the condition of the data to be combined. However, the color to be transmissive (case (1)), and the transmittance (case (2) or (3)) may be changed depending on the condition without being limited to the aforementioned setting.

The screen layer entirely filled in a specific color is used as the background layer 42. In such a case, the transmissive color in the case (1) is the same as or close to the color for filling the background layer 42. When the user of the screen layer (application program) requires the transmission in the aforementioned state, that is, when the transmission specification is enabled, the transmission specification of the subject screen layer is disabled by the middleware if the other screen layer is not combined with the back surface of the subject screen layer. The region filled in the transmissive color is supposed to have the color of the background layer 42 displayed. When the transmission specification is disabled, the transmissive color is displayed without being transmitted. However, as the transmissive color is the same as that of the background layer 42, those colors are apparently the same for the user. When the transmission specification is disabled, the combining operation by the driver 30 and subsequent process may be cancelled to allow the mobile phone 1 to execute the display control for a shorter period.

The request for the screen update from the application program is indirectly sent to the driver 30 via the middleware. The request to the driver 30 may be changed based on the determination with respect to the screen layer structure by the middleware to optimize such request to the driver 30 while keeping the application program less conscious about the processing.

The middleware is allowed to disable the transmission specification only when the following conditions (4) to (6) are satisfied.
(4) The transmission specification of the subject screen layer to be updated is set as defined in the case (1).
(5) The image allocated to the subject screen layer to be updated covers the entire screen 44 on the display 13.
(6) The screen layer in use does not exist on the back surface of the subject screen layer to be updated.

The timing for which the middleware makes the determination may be defined as one of the following timings (7) and (8).
(7) Timing when the attribute information (transmission specification) with respect to the screen layer changes.
(8) Timing when the request for starting/finishing the use of the screen layer is generated.

Figure 6:
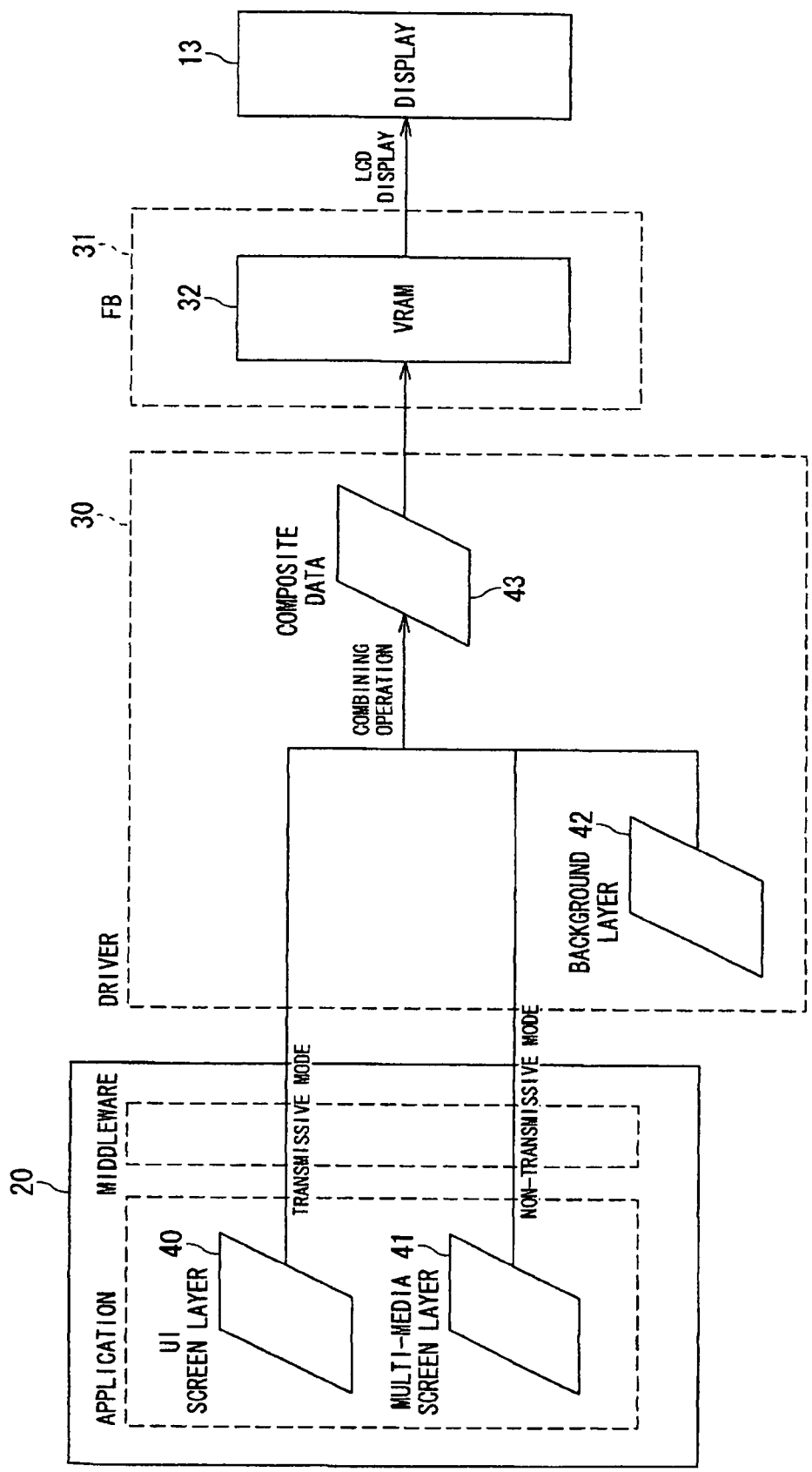
FIG. 6 is a view schematically showing the display control routine in the mobile terminal (mobile phone) according to the present invention when the UI screen layer is in the transmissive mode, and the multi-media screen layer is in the non-transmissive mode.
Figure 7:
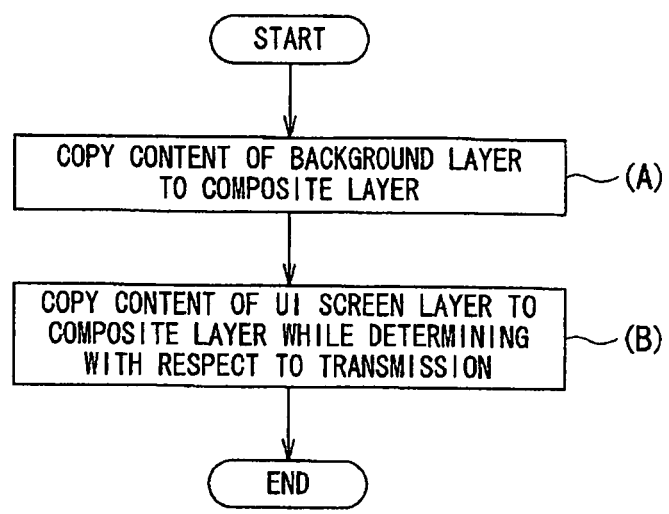
FIG. 7 is a flowchart showing the routine for combining the background layer under the display control of the mobile terminal (mobile phone) according to the present invention.

Referring to FIG. 6, in the case where the transmission specification of the UI screen layer 40 is "enabled", the transmission specification of the multi-media screen layer 41 is "disabled", and the size of the media screen layer 41 is smaller than that of the display, the middleware enables the transmission specification in accordance with the setting established by the application program to allow the driver 30 to combine the UI screen layer 40, the multi-media screen layer 41, and the background layer 42 to generate the composite display data 43. As shown in FIG. 7, the driver 30 performs the following operations, that is, copies the content of the background layer 42 on the screen of the composition display data 43 (operation (A)), and copies the content of the UI screen layer 40 to the composite display data 43 while determining with respect to the transmission (operation (B)).

Figure 8:
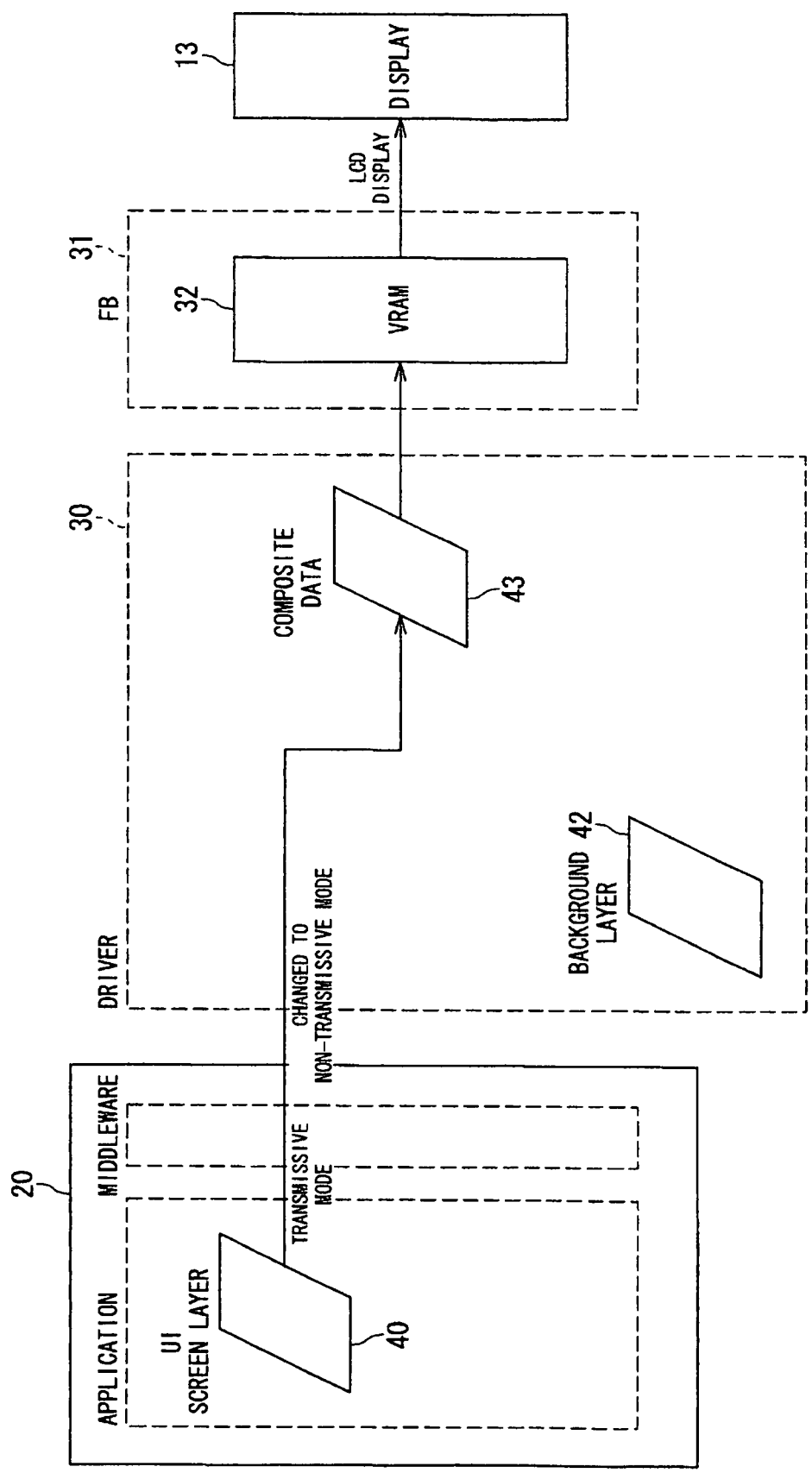
FIG. 8 is a view schematically showing the display control routine in the mobile terminal (mobile phone) according to the present invention when the UI screen layer is in the transmissive mode, and the multi-media screen layer does not exist.

Referring to FIG. 8, in the case where the transmission specification of the UI screen layer 40 is "enabled", and any other screen layer does not exist on the back surface, the middleware disables the transmission specification (the setting of the "transmissive mode" may be changed to the "non-transmissive mode") to cancel the processing performed by the driver 30 for combining the background layer 42. In the aforementioned case, the driver 30 copies the content of the UI screen layer 40 on the screen of the composite display data 43 (operation (C)). Even if the "transmissive mode" is set, the transmissive portion has the same color as that of the background layer 42 or the color similar thereto. So the same result may be obtained even when the screen of the background layer 42 is combined. The aforementioned combining operation is cancelled for the purpose of reducing the calculation work.

Figure 9:
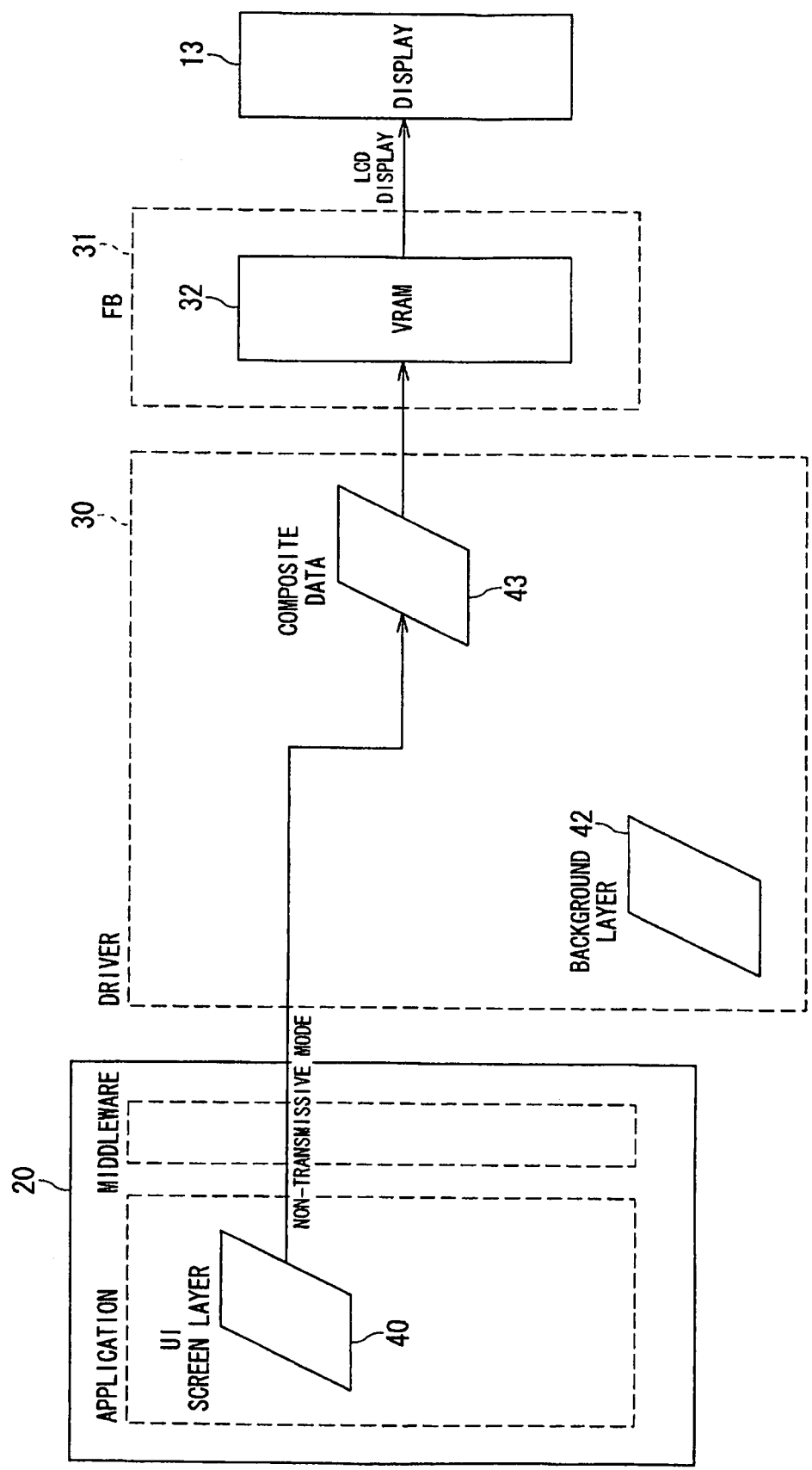
FIG. 9 is a view schematically showing the display control routine in the mobile terminal (mobile phone) according to the present invention when the UI screen layer is in the non-transmissive mode, and the multi-media screen layer does not exist.
Figure 10:
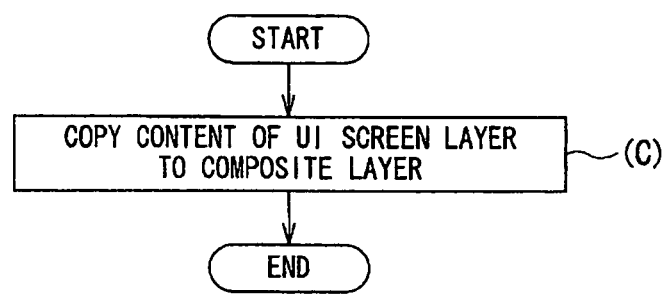
FIG. 10 is a flowchart showing the process for cancelling the combination of the background layer under the display control routine executed in the mobile terminal (mobile phone) according to the present invention.

Referring to FIG. 9, in the case where the transmission specification of the UI screen layer 40 is "disabled", the middleware cancels the combining operation of the background layer 42 performed by the driver 30 while keeping the transmission specification disabled. In the aforementioned case, the driver 30 performs the operation (C), that is, copies the content of the UI screen layer 40 on the screen of the composite display data 43.

Figure 11:
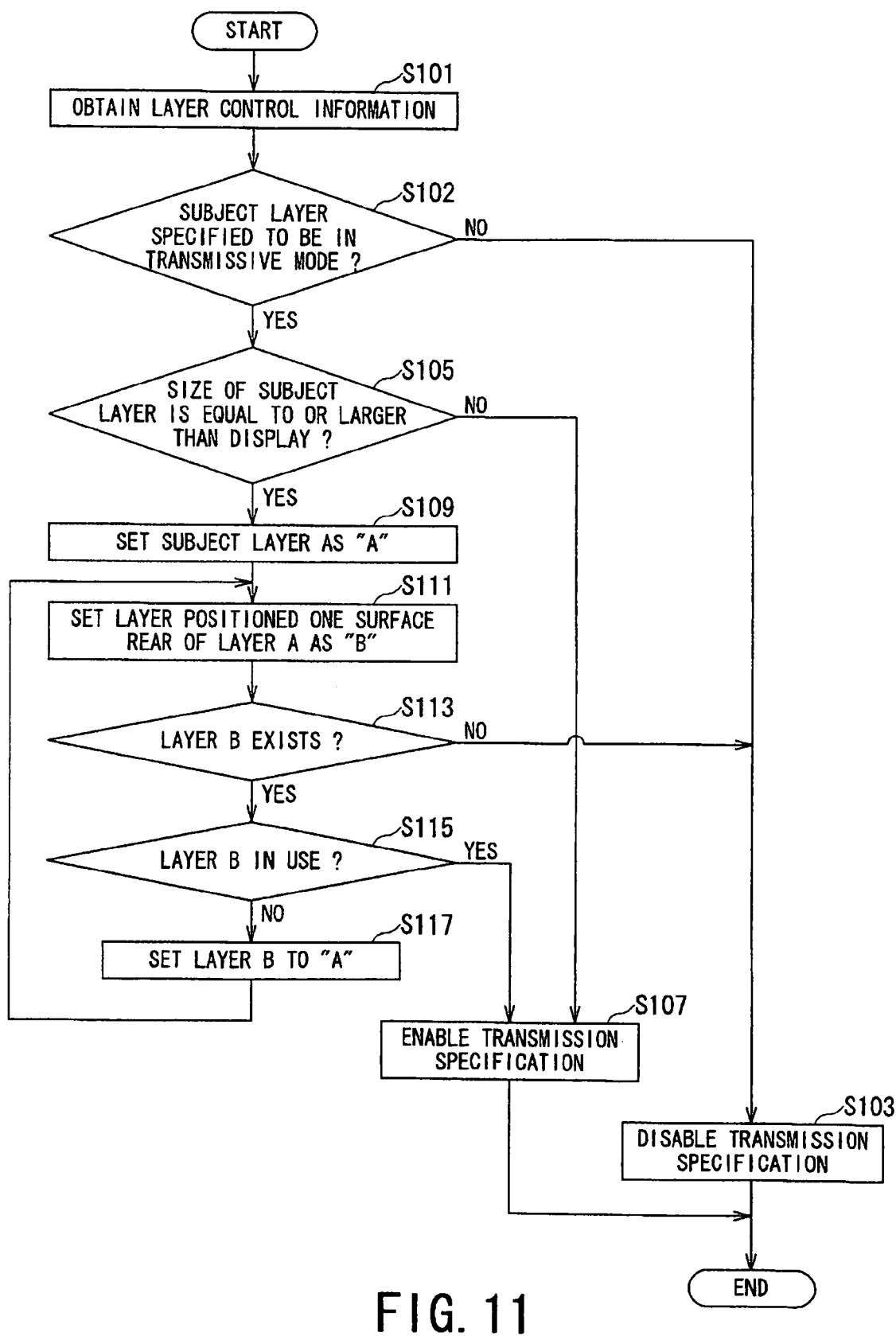
FIG. 11 is a flowchart showing the display control routine upon updating of the screen layer in the mobile terminal (mobile phone) according to the present invention.
Figure 12:
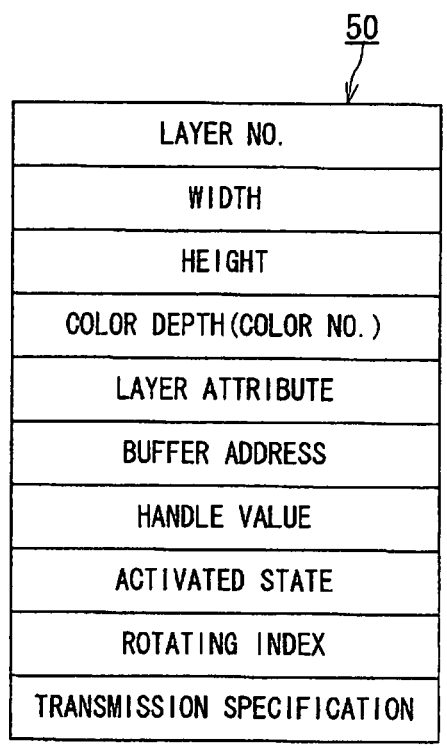
FIG. 12 is a chart showing the data structure of the layer control information.

The mobile phone 1 is structured to allow the middleware to change the transmission specification of the respective screen layers based on the states of the plural screen layers formed by the currently executed application program. As a result, the updating performance of the screen may be improved without modifying the application program to be executed. The procedure of the display control routine executed by the mobile phone 1 will be described referring to the flowchart shown in FIG. 11. The term "step S101" will be referred to as "S101" by omitting "step" hereinafter.

The display control processing upon the change in the attribute information (transmission specification) with respect to the screen layer will be described. When the mobile phone 1 is operated, for example, when the user inputs through the operation keys 15, receives data through the mail/browser, or ends the currently executed process to require the rewiring of the display screen 44 on the display 13, the main control unit 20 generates the screen layer of the display screen 44 under the control of the application program, and sets the transmission specification of each screen layer based on the control executed by the middleware.

The main control unit 20 obtains layer control information 50 of the subject layer (screen layer having the attribute information changed) (S101). The layer control information 50 is controlled by the middleware for each array by the number of the layers, and contains the layer number, width, height, color depth (color number), layer attribute, buffer address, handle value, activated state, rotating index, transmission specification and the like.

The layer number is the information which denotes the layer identifier as well as the order of the screen layer (for example, the screen layer on the rearmost surface is set to "0", and "1" is incremented as the layer is increased forward). The layer attribute is the information which indicates whether the layer is the UI screen layer or the multi-media screen layer. If the layer attribute indicates the UI screen layer, the usage is fixed. So the middleware holds the image buffer to be sent to the driver. If the layer attribute indicates the multi-media screen layer, the screen size or the number of the frame screens becomes variable. So the middleware holds no buffer.

The handle value is issued when the screen layer is in use, and serves as the information which indicates the user of the screen layer. The activated state is the information which indicates whether or not the screen layer is in use (whether or not it is actually used in the application program). When the screen layer is used (formed), it is used for controlling whether or not the issued handle value is actually displayed. The rotating index is the information indicating presence/absence of the rotating display. If the screen layer includes the transmissive region, the transmission specification is "enabled", and if the screen layer includes no transmissive region, the transmission specification is "disabled".

The main control unit 20 determines whether or not the transmission of the subject layer is specified (S102). When the transmission specification of the layer control information 50 obtained in step S101 is "enabled", it is determined that the transmission of the subject layer has been specified. When the transmission of the subject layer is not specified (No in 3102), the main control unit 20 disables the transmission specification (S103). The driver 30 is allowed to cancel the combining operation of the background layer 42.

When the transmission of the subject layer is specified (Yes in S102), the main control unit 20 determines whether or not the size of the subject layer is equal to or larger than that of the screen 44 on the display 13 (S105). At this time, the main control unit 20 makes the determination based on the width and the height of the layer control information 50 acquired in step S101.

When the size of the subject layer is not equal to or larger than that of the screen 44 (No in S105), the subject layer has the size smaller than that of the screen 44 on the display 13. Accordingly, the subject layer is required to be combined with the other screen layer or the background layer 42. So the main control unit 20 enables the transmission specification (S107).

When the size of the subject layer is equal to or larger than that of the screen 44 (Yes in S105), the main control unit 20 sets the subject layer as "A" (S109). The main control unit 20 obtains the layer at the back side of the layer A set in step S109 or S117 so as to be set as "B" (S111).

The main control unit 20 determines whether or not the screen layer B set in step S109 exists (S113). At this time, the main control unit 20 determines whether or not the screen layer B exists based on the handle value of the layer control information 50 obtained in step S101. When the screen layer B does not exist (No in S113), the main control unit 20 disables the transmission specification (S103) to allow the driver 30 to cancel the combining operation of the background layer 42.

When the layer B exists (Yes in S113), the main control unit 20 determines whether or not the layer B is in use (S115). At this time, the main control unit 20 makes the determination whether or not the screen layer A is in use based on the activated state of the layer control information 50 obtained in step S109.

When the layer B is in use (Yes in S115), the other screen layer is combined with the back surface of the subject layer. Then the main control unit 20 enables the transmission specification (S107) to allow the driver 30 to combine the background layer 42.

When the layer B is not in use (No in S115), the main control unit 20 sets the layer B set in step S111 as A (S117). Then the process returns to step S111 where the main control unit 20 determines whether or not the layer B exists.

In the case where the screen layer to be combined with the screen 44 on the display 13 in the mobile phone 1, the middleware determines with respect to the structure state of the screen layer. Even if the subject layer has the size smaller than that of the screen 44 on the display 13, or the screen layer on the back surface is in use, the transmission specification is kept enabled. When the screen layer on the back surface does not exist, the transmission specification is disabled.

Figure 13:
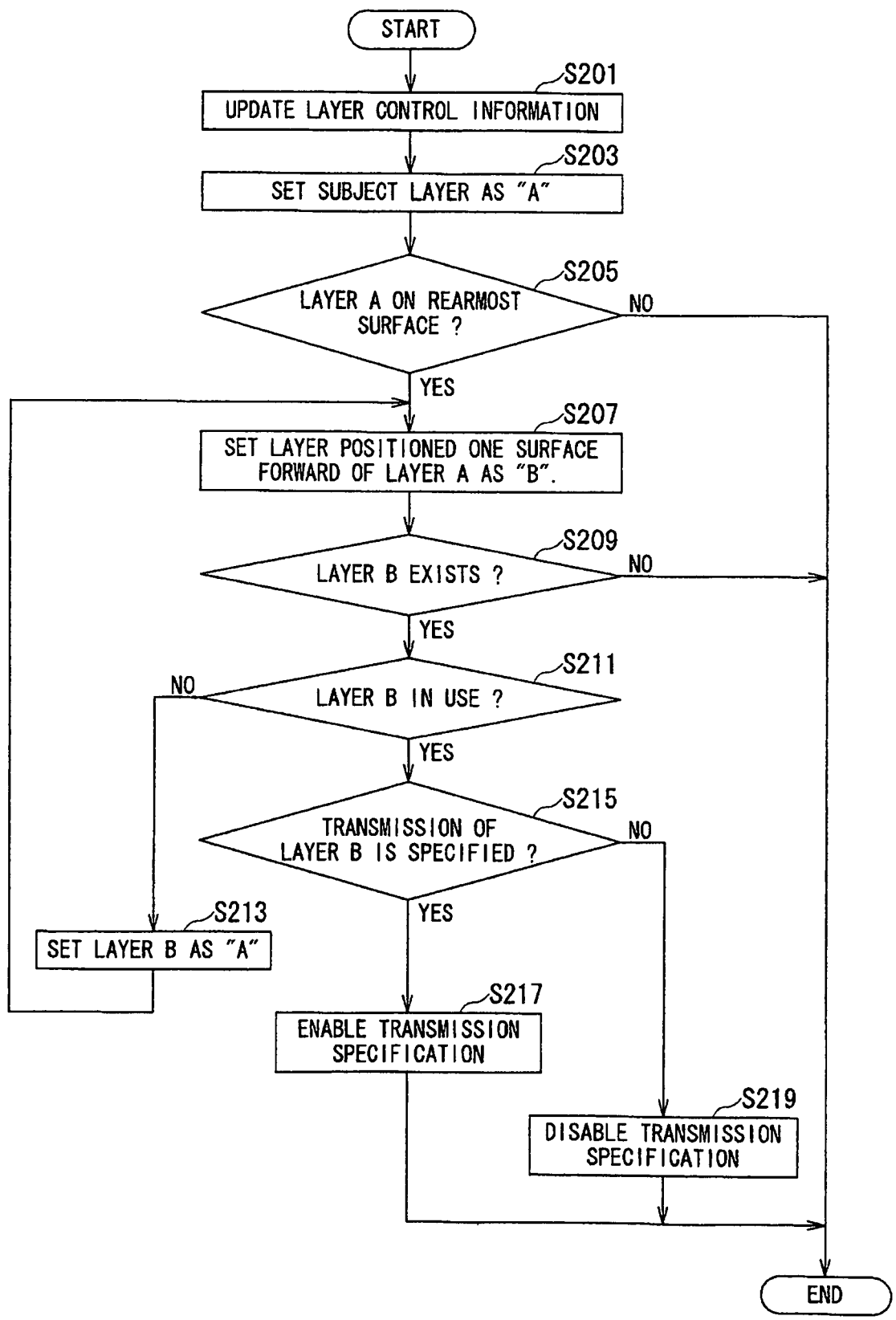
FIG. 13 is a flowchart showing the display control routine when the screen layer is started in the mobile terminal (mobile phone) according to the present invention.

The procedure for the display control upon start of the use of the screen layer in the mobile phone 1 will be described referring to the flowchart shown in FIG. 13. When the use of the screen layer is started, and the started screen layer is positioned on the rearmost surface, the determination with respect to the transmission specification of the front screen layer is made again under the control of the middleware to specify the transmissive mode again.

The main control unit 20 updates the layer control information 50 stored in the middleware (S201). At this time, the information with respect to the started screen layer is updated in the layer control information 50. The main control unit 20 sets the subject layer (the use of the screen layer is started) as the layer A (S203).

The main control unit 20 determines whether or not the screen layer A set in step S203 or S213 corresponds to the one on the rearmost surface (S205). The main control unit 20 makes the determination based on the layer number of the layer control information 50 updated in step S201. When the screen layer A does not correspond to the one on the rearmost surface (No in S205), the main control unit 20 ends the routine.

When the screen layer A corresponds to the one on the rearmost surface (Yes in S205), the main control unit 20 sets the screen layer positioned one surface forward of the screen layer A set in step S203 or S213 as the screen layer "B" (S207).

The main control unit 20 determines whether or not the screen layer B set in step S207 exists (S209). The main control unit 20 makes the determination based on the handle value of the layer control information 50 set in step S201. When the screen layer B does not exist (No in S209), the main control unit 20 ends the routine.

When the screen layer B exists (Yes in S209), the main control unit 20 determines whether or not the layer B set in step S207 is in use (S211). The main control unit 20 makes the determination based on the activated state of the layer control information 50 updated in step S201.

When the screen layer B is not in use (No in S211), the main control unit 20 sets the screen layer B as the screen layer "A" (S213). The process returns to step S207 where the main control unit 20 executes the process from steps 3209 to S219 having the screen layer positioned one surface forward of the screen layer A set in step S213 set as "B".

When the screen layer B is in use (Yes in S211), the main control unit 20 determines whether or not transmission of the screen layer B set in step S207 is specified (S215). The main control unit 20 determines that transmission of the subject layer is specified when the transmission specification of the layer control information 50 updated in step S201 is "enabled".

When transmission of the screen layer B set in step S207 is specified (Yes in S215), the subject layer is required to be combined with the other screen layer or the background layer 42. So the main control unit 20 enables the transmission specification (S217). Meanwhile, when transmission of the screen layer B set in step S207 is not specified (No in S215), the subject layer does not have to be combined with the other screen layer or the background layer 42. So the main control unit 20 disables the transmission specification (S219).

Upon start of the use of the screen layer to be combined with the screen 44 on the display 13 in the mobile phone 1, if the subject layer corresponds to the one on the rearmost surface, and the transmission specification of the screen layer on the front surface is enabled, the transmission specification is kept enabled even if the transmission specification of the subject layer has been enabled. Meanwhile, if the subject layer is the one on the rearmost surface, and the transmission specification of the screen layer on the front surface is disabled, the transmission specification is disabled.

Figure 14:
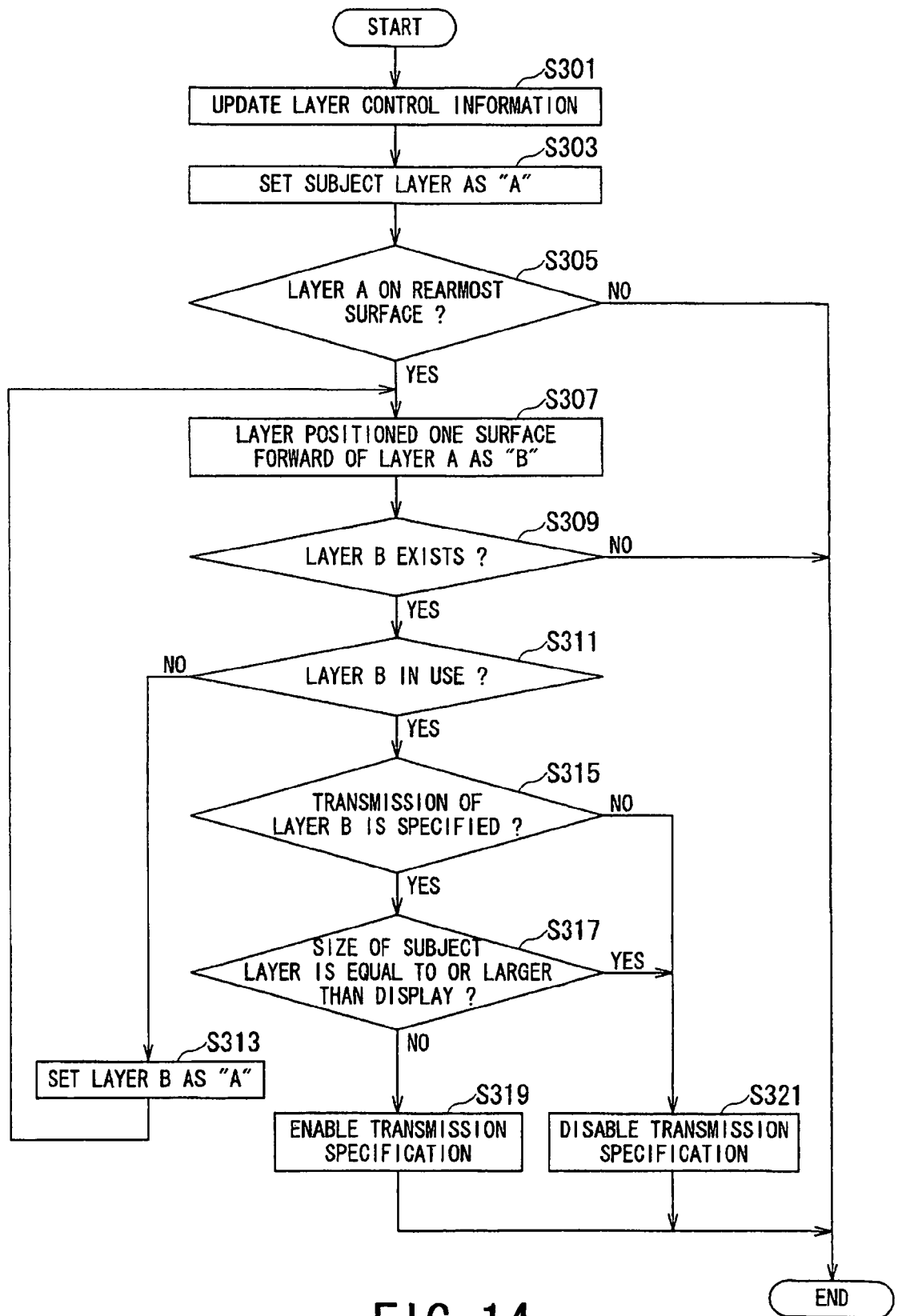
FIG. 14 is a flowchart showing the display control routine when finishing the screen layer in the mobile terminal (mobile phone) according to the present invention.

The procedure for the display control process when the use of the screen layer is finished in the mobile phone 1 will be described referring to the flowchart shown in FIG. 14. When the use of the screen layer is finished, and the finished screen layer corresponds to the one on the rearmost surface, the transmission specification of the screen layer on the front surface is determined again under the control of the middleware to specify the transmission mode again.

The main control unit 20 updates the layer control information 50 stored in the middleware (S301). The information of the layer control information 50 with respect to the finished screen layer is updated. The main control unit 20 sets the subject layer (the screen layer having its use finished) as "A" (S303).

The main control unit 20 determines whether or not the screen layer A set in step S303 or S313 corresponds to the one on the rearmost surface (S305). The main control unit 20 makes the determination based on the layer number of the layer control information 50 updated in step S301. When the screen layer A does not correspond to the one on the rearmost surface (No in S305), the main control unit 20 ends the routine.

When the screen layer A corresponds to the one on the rearmost surface (Yes in S305), the main control unit 20 sets the screen layer positioned one surface forward of the screen layer A set in step S303 or S313 as "B" (S307).

The main control unit 20 determines whether or not the screen layer B set in step S307 exists (S309). The main control unit 20 makes the determination based on the handle value of the layer control information 50 updated in step S301. When the screen layer B does not exist (No in S309), the main control unit 20 ends the routine.

When the screen layer B exists (Yes in S309), the main control unit 20 determines whether or not the layer B set in step S307 is in use (S311). The main control unit 20 makes the determination based on the activated state of the layer control information 50 updated in step S301.

When the screen layer B is not in use (No in S311), the main control unit 20 changes the screen layer B to the screen layer "A" (S313). The process returns to step S207 where the main control unit 20 executes the process from steps S309 to S321 while setting the screen layer positioned one surface forward of the screen layer of A set in step S213 as "B".

When the screen layer B is in use (Yes in S311), the main control unit 20 determines whether or not the transmission of the screen layer B set in step S307 is specified (S315). The main control unit 20 determines that the transmission of the subject layer is specified when the transmission specification of the layer control information 50 updated in step S301 is "enabled".

When the transmission of the screen layer B set in step S307 is specified (Yes in S315), the main control unit 20 determines whether or not the size of the subject layer is equal to or larger than that of the screen 44 on the display 13 (S317). The main control unit 20 makes the determination based on the width and height of the layer control information 50 in step S301.

When the transmission of the layer B is specified, and the size of the subject layer is not equal to or larger than that of the screen 44 on the display 13 (No in S317), the main control unit 20 enables the transmission specification (S319). When the transmission specification on the screen layer B set in step S307 does not exist (No in S315), or the size of the subject layer is equal to or larger than that of the screen 44 on the display 13 (Yes in S317), the main control unit 20 enables the transmission specification (S321).

When finishing the use of the screen layer to be combined with the screen 44 on the display 13 in the mobile phone 1, the middleware determines with respect to the screen layer structure while having the transmission specification of the subject layer enabled. Irrespective of the aforementioned state, when the subject layer is the one on the rearmost surface, the transmission specification of the screen layer on the front surface is enabled, and the size of the subject layer is smaller than that of the screen 44, the transmission specification is enabled. When the subject layer is the one on the rearmost surface and the transmission specification of the screen layer on the front surface is disabled, or when the subject layer is the one on the rearmost surface, the transmission specification of the screen layer on the front surface is enabled, and the size of the subject layer is equal to or larger than that of the screen 44, the transmission specification is disabled.

In the mobile terminal (mobile phone 1) according to the present invention, composition of the background layer may be cancelled when it is unnecessary under the display control. This may improve the updating performance of the screen requiring no need of correction of the upper application program, and further improve the response to the user's operation by reducing the load.

The mobile phone 1 according to the present invention has been described. However, the mobile terminal of any type, for example, PHS, PDA, a PC, a music player, a digital camera, and a game machine may be employed so long as the image display processing is performed.

What is claimed is:

1. A method of generating a screen displayed by a display unit of a mobile terminal which combines a plurality of screen layers, the method comprising:
    determining at a controller connected to the display unit whether or not a transmission specification of a subject screen layer to be updated is enabled upon updating of the screen displayed by the display unit,
    determining at the controller whether or not a size of the subject screen layer to be updated is equal to or larger than a size of a screen displayed by the display unit when the controller determines that the transmission specification is enabled,
    determining at the controller whether or not the screen layer to be combined on a back surface of the subject screen layer to be updated exists when the controller determines that the size of the subject screen layer to be updated is equal to or larger than the size of the screen to be displayed by the display unit; and
    controlling the controller to disable the transmission specification of the subject screen layer to be updated when the controller determines that the screen layer to be combined on the back surface does not exist.

2. The method according to claim 1, further comprising:
    determining at the controller whether or not the screen layer to be combined on the back surface is in use when the it is determined at the controller that the screen layer to be combined on the back surface exists; and
    determining at the controller whether or not a screen layer to be combined on a back surface of the screen layer combined on the back surface which is determined by the controller as not being in use exists when the fifth controller determines that the screen layer to be combined on the back surface is not in use.

3. The method according to claim 2, further comprising:
    enabling the transmission specification of the subject screen layer to be updated when the controller determines that the screen layer to be combined on the back surface is in use.

4. The method according to claim 1, further comprising:
    disabling the transmission specification of the subject screen layer to be updated when the controller determines that the transmission specification is disabled.

5. The method according to claim 1, further comprising:
    determining at the controller whether or not a subject screen layer having its use started is combined on a rearmost surface upon start of a use of the screen layer to be combined with a screen displayed by the display unit;
    determining at the controller whether or not a screen layer to be combined with a front surface of the subject screen layer having its use started exists to be in use when the controller determines that the subject screen layer having its use started is combined on the rearmost surface;
    determining at the controller whether or not the transmission specification of the screen layer to be combined on the front surface is enabled when the controller determines that the screen layer to be combined with the front surface of the subject screen layer having its use started exists to be in use and
    wherein the controller disables the transmission specification of the subject screen layer having its use started when the controller determines that the transmission specification is not enabled.

6. The method according to claim 5, further comprising determining at the controller whether or not the screen layer to be combined on a front surface of the screen layer which is determined by the controller as existing not to be in use exists when the controller determinates that the transmission specification of the screen layer to be combined on the front surface is enabled.

7. The method according to claim 5, further comprising enabling the transmission specification of the subject screen layer having its use started when the controller determines that the transmission specification has been enabled.

8. The method according to claim 1, further comprising:
    determining at the controller whether or not a subject screen layer having its use finished is combined on a rearmost surface when the use of the screen layer to be combined with the screen displayed by the display unit is finished;
    determining at the controller whether or not the screen layer to be combined with the front surface of the subject screen layer having its use finished exists to be in use when the controller determines that the subject screen layer having its use finished is combined on the rearmost surface; and
    determining at the controller whether or not the transmission specification of the screen layer to be combined on the front surface is enabled when the controller determines that the screen layer to be combined with the front surface of the subject screen layer having its use finished exists to be in use,
    wherein the controller disables the transmission specification of the subject screen layer having its use finished when the controller determines that the transmission specification is not enabled.

9. The method according to claim 8, further comprising:
    determining at the controller whether or not a size of the subject screen layer having its use finished is equal to or larger than a size of the screen to be displayed by the display unit when the controller determines that the transmission specification is enabled; and
    disabling the transmission specification of the subject screen layer having its use finished when the controller determines that the size of the subject screen layer having its use finished is equal to or larger than the size of the screen to be displayed by the display unit.

10. The method according to claim 8, further comprising:
    enabling the transmission specification of the subject screen layer having its use finished when the controller determines that the size of the subject screen layer having its use finished is smaller than the size of the screen to be displayed by the display unit.

* * * * *